(12) United States Patent
Millsap

(10) Patent No.: US 10,136,581 B2
(45) Date of Patent: Nov. 27, 2018

(54) MID-SIZE OR BIG BALE STACK BED WAGON AND BALE LOADER ARM ASSEMBLY

(71) Applicant: Leland K. Millsap, Fruitland, ID (US)

(72) Inventor: Leland K. Millsap, Fruitland, ID (US)

( * ) Notice: Subject to any disclaimer, the term of this patent is extended or adjusted under 35 U.S.C. 154(b) by 0 days.

(21) Appl. No.: 15/413,386

(22) Filed: Jan. 23, 2017

(65) Prior Publication Data
US 2017/0202147 A1    Jul. 20, 2017

Related U.S. Application Data

(60) Provisional application No. 62/281,184, filed on Jan. 20, 2016.

(51) Int. Cl.
| | |
|---|---|
| *A01D 90/08* | (2006.01) |
| *B65G 57/28* | (2006.01) |
| *A01D 90/10* | (2006.01) |
| *B60P 1/28* | (2006.01) |
| *B60P 1/48* | (2006.01) |

(52) U.S. Cl.
CPC ............ *A01D 90/08* (2013.01); *A01D 90/10* (2013.01); *B60P 1/28* (2013.01); *B60P 1/486* (2013.01); *B65G 57/28* (2013.01)

(58) Field of Classification Search
CPC . A01D 90/08; A01D 90/10; B60P 1/28; B60P 1/486; B65G 57/28
USPC ........................................ 414/24.5, 24.6, 111
See application file for complete search history.

(56) References Cited

U.S. PATENT DOCUMENTS 6,514,029 B2 *   2/2003   Millsap .................. A01D 90/08
                                                                                414/24.5
8,585,342 B2 *  11/2013   Smith .................... A01D 90/08
                                                                                414/111

* cited by examiner

*Primary Examiner* — Lynn E Schwenning
(74) *Attorney, Agent, or Firm* — Charles R. Clark

(57) ABSTRACT

An improved stack bed wagon is provided for pickup of one or more mid-size or big bales in an agricultural field for transport that simultaneously tilts and rotates a longitudinal bale 90 degrees upwardly and transversely over, adjacent, and along the forward upper edge of a stack bed for pushback onto the stack bed for transport or for consolidation with one or more similar bales in a single layer stack load on the stack bed that can be offloaded from the wagon to the field for later pickup and movement or that can be used for transport of the stack load for deposit in a different place or that can be used for the retrieval of a stack load from a field, ground, or storage surface.

8 Claims, 12 Drawing Sheets

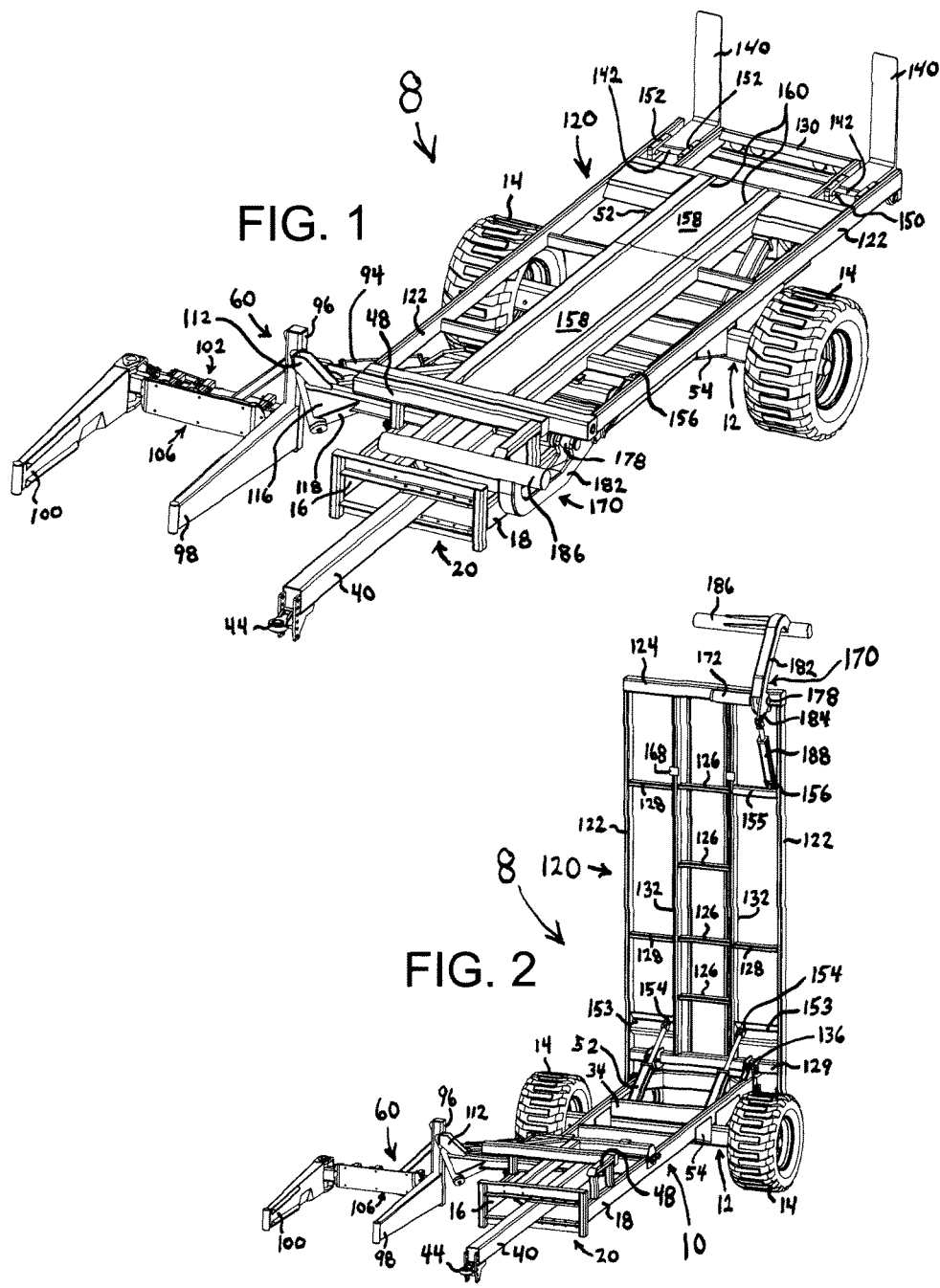

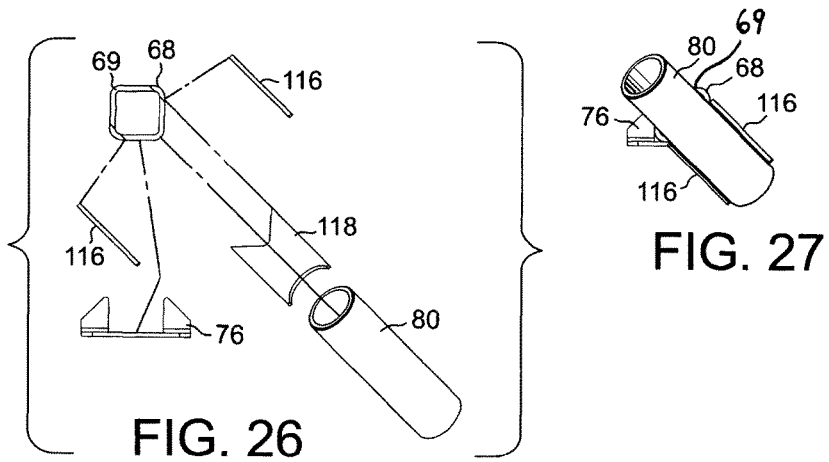
FIG. 26
FIG. 27
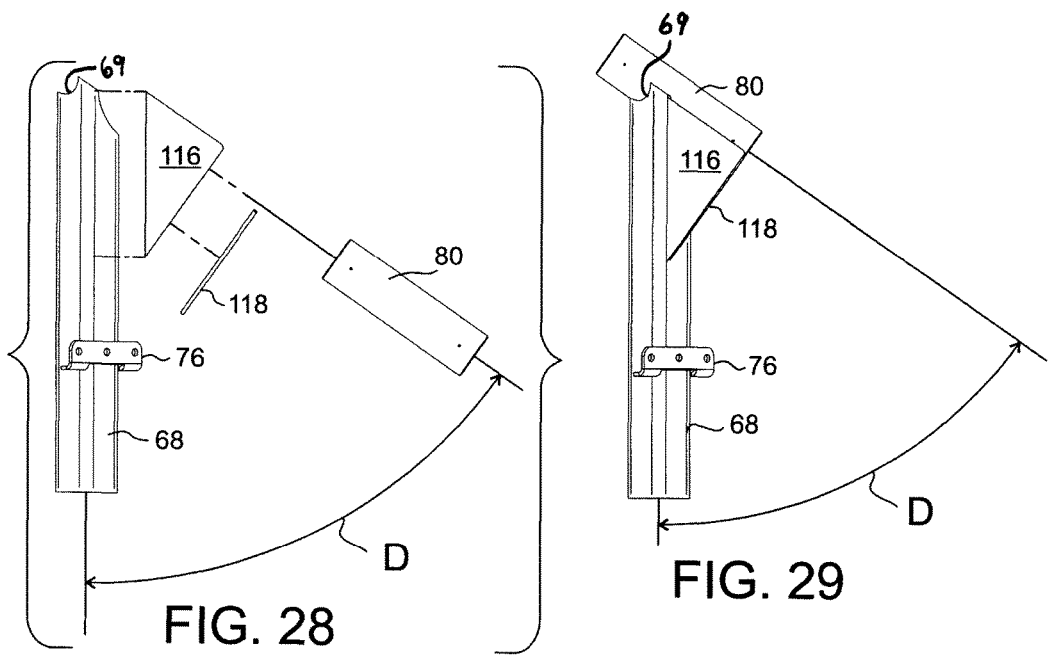
FIG. 28
FIG. 29

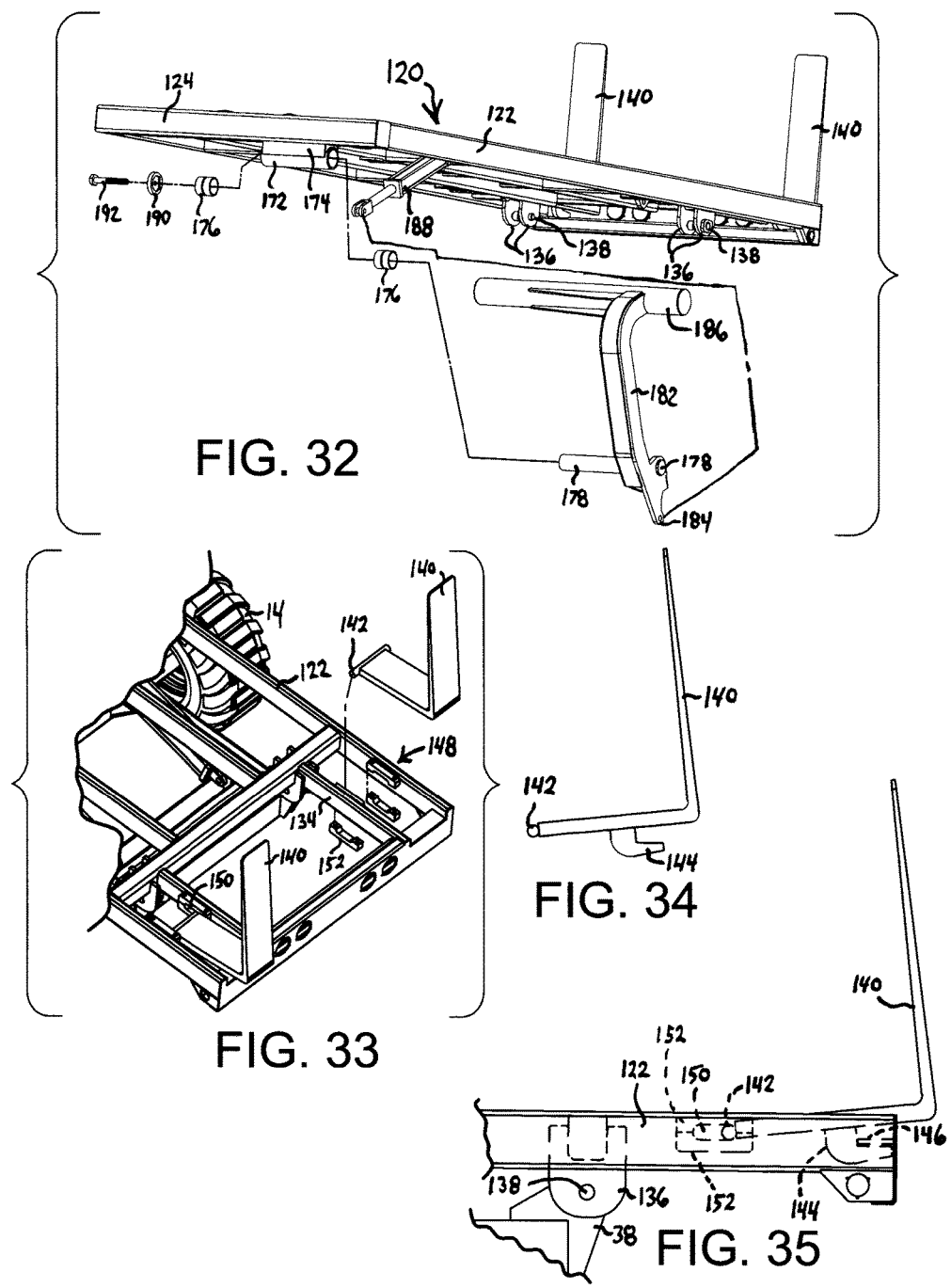

MID-SIZE OR BIG BALE STACK BED WAGON AND BALE LOADER ARM ASSEMBLY

CROSS-REFERENCE TO RELATED APPLICATIONS

This application claims the benefit of U.S. Provisional Application No. 62/281,184, filed Jan. 20, 2016.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Field of the Invention

The present invention relates to a novel mid-size or big bale stack bed wagon 8 that incorporates a novel bale loader arm assembly 60. The bale loader arm assembly 60 is attached to a forward portion of a lower support frame assembly 10 of the stack bed wagon. When in use in an agricultural setting such as a hay bale harvest field, the loader arm assembly clasps a mid-size or big bale that is oriented longitudinally along the direction of wagon travel in the harvest field; simultaneously lifts and rotates the clasped bale approximately 90 degrees up and approximately 90 degrees horizontally and places the bale across a forward portion of a bale stack bed assembly 120 of the wagon and stabilizes the bale until the bale is engaged and pushed rearward along the stack bed assembly by a pusher clamping arm (bale pushback cross member 186) of a bale pushback and stack clamping assembly 170 that is attached to a front portion of the stack bed assembly.

Field of the Invention

The present invention relates to providing a novel bale stack bed wagon 8 (bale pickup and transport vehicle) that incorporates a novel bale loader arm assembly 60 that picks up a mid-size or big bale from the ground and simultaneously tilts and rotates the bale from a fore and aft orientation (parallel to the direction of wagon travel) to a transverse orientation (across the front portion of the wagon) with the bale surface that was on the ground tilted up and rotated 90 degrees to become the forward transverse surface of the picked-up bale that is towards the front of the wagon.

BRIEF SUMMARY OF THE INVENTION

The invention enables the lifting, rotating, and depositing of one mid-size or big bale or a plurality of mid-size or big bales from a work surface (the ground) to a stack bed assembly 120 of the wagon for consolation into a stack load with other bales for transport from the field. The invention allows selective 90 degree rotation of a bale around two axes from the ground onto a stack bed assembly.

A principal objective of this invention is to provide a novel mid-size or big bale stack wagon that is lightweight, compact, simple, low-maintenance, and reliable for use in a system that permits a farmer or other user a more economical and useful agricultural tool.

Additional and various other objects and advantages attained by the invention will become more apparent as the specification is read and the accompanying figures are reviewed.

The mid-size or big bale stack bed wagon 8 in the preferred embodiment uses six hydraulic actuators. Each actuator requires the hook up of two hydraulic lines. The twelve hydraulic lines preferably are powered in a manner well understood in the hydraulic power art by a hydraulic system on a prime mover (a farm tractor) hitched to the wagon. The control of the invention's actuators may be accomplished by selective manual controls or by appropriate software of a control system that controls the hydraulic system of the prime mover to control the six actuators in a manner generally known in the hydraulic power art. In the views (FIGS. 1 to 35), the hydraulic lines are not shown to allow viewing of invention elements that would otherwise be obscured.

The preferred embodiment uses hydraulic actuators, but other comparable devices including pneumatic actuators could be used.

BRIEF DESCRIPTION OF THE SEVERAL VIEWS OF THE DRAWING

FIG. 1 is a perspective view from above the left front of a mid-size or big bale stack bed wagon 8 showing a wagon draw bar 40 aligned right to left with the longitudinal center axis of the wagon and showing the bale loader arm assembly 60 in an arm down position, showing a stack bed assembly 120 in a bed down position, and showing a bale pushback and stack clamping assembly 170 in a clamp down position;

FIG. 2 is a perspective view from above the left front of the stack bed wagon 8 shown in FIG. 1 showing the loader arm assembly 60 in the arm down position (bale receiving position), showing the stack bed assembly 120 in a bed up position, and showing the bale pushback and stack clamping assembly 170 in the clamp down position;

FIG. 26 is an exploded side plan view of the front cross pivot support rail 68, the coped rail end 69 (coped at 45 degrees across the right end of the pivot support rail from upper left to lower right) to be attached to said loader arm pivot shaft lower sleeve 80 looking in along the longitudinal center axis of the cross pivot support rail and showing two spaced lower sleeve cheek gussets 116, a lower sleeve face gusset 118 coped at one end to be attached to said lower sleeve and coped at the opposite end to be attached to said support rail, and an arm assembly mounting bracket 76;

FIG. 27 is a side plan view of the front cross pivot support rail 68 attached to said loader arm pivot shaft lower sleeve 80 looking in along the longitudinal center axis of the cross pivot support rail and showing two spaced lower sleeve cheek gussets 116 attached to said lower sleeve, and an arm assembly mounting bracket 76 attached to said support rail outer surface;

FIG. 28 is a partially exploded plan view of the front cross pivot support rail 68 having a coped rail end 69 to be attached to said loader arm pivot shaft lower sleeve 80 looking perpendicularly down on one of the spaced sleeve cheek gussets 116 and on the lower sleeve; and showing the lower sleeve face gusset 118 to be attached to said lower sleeve and said support rail, and an arm assembly mounting bracket 76 attached to said support rail, and showing the preferred angle D of intersection of the coped rail end 69 descending diagonally across opposite catacorner corners (from upper left rear corner descending to the lower right front corner) of the pivot shaft rail to the pivot shaft lower sleeve is 55 degrees between the longitudinal center axes of the lower sleeve and the pivot support rail;

FIG. 29 is a plan view of the front cross pivot support rail 68, the coped rail end 69 attached to said loader arm pivot shaft lower sleeve 80 looking perpendicularly down on one of the sleeve cheek gussets 116 and on said lower sleeve, said sleeve cheek gusset attached to said lower sleeve and said support rail, and showing said lower sleeve face gusset 118 attached to said lower sleeve and one of said sleeve gussets, and an arm assembly mounting bracket 76 attached to said support rail and showing the preferred angle D of intersection of the coped rail end 69 to the pivot shaft lower sleeve is 55 degrees between the longitudinal center axes of the lower sleeve and the pivot support rail;

FIG. 32 is a perspective view from below the left front quarter of the stack bed assembly 120 shown in FIG. 1 with the bale pushback and stack clamping assembly 170 partially exploded and said clamping assembly in a clamp intermediate position;

FIG. 33 is a partially exploded partial perspective view of the stack bed wagon 8 from above and from the rear from the left rear corner of the wagon shown in FIG. 9 showing a stack bed rear bale retention fork 140 having a fork pivot dowel 142 attached transversely across the distal end of each respective fork lower leg and said dowel having ends extending outward beyond the sides of the fork lower leg and showing a fork retention means 148 (preferably regarding each said respective pivot dowel two pairs of opposing and cooperating elongated C-shaped slot defining members 152 that are attached to facing portions of respective inner surfaces of a respective longitudinal outer bale support rail 122 and of a respective longitudinal rear inner support rail 134 to receive and retain in two spaced and cooperating pivot dowel retention slots 150 the dowel ends of respective bale retention forks when each said respective pair of slot defining members are joined together forming a respective retention slot (central upper bed skin panels not shown to allow viewing of elements that would otherwise be obscured), said retention forks could also be attached in a fixed position to two spaced rearward upper portions of said stack bed assembly or attached by attachment means well understood in the art;

FIG. 34 is a left side plan view of the stack bed rear bale retention fork 140 shown in FIG. 33 and showing a fork hold-down crook 144 attached to the bottom surface of the retention fork; and FIG. 35 is a partial left side plan view of the stack bed wagon 8 shown in FIG. 33 showing the stack bed rear bale retention fork 140 having a fork pivot dowel 142 retained in the retention slot 150 and showing the hold-down crook 144 engaging a fork hold-down crook retention bar 146.

DETAILED DESCRIPTION OF THE INVENTION

Figure 3:
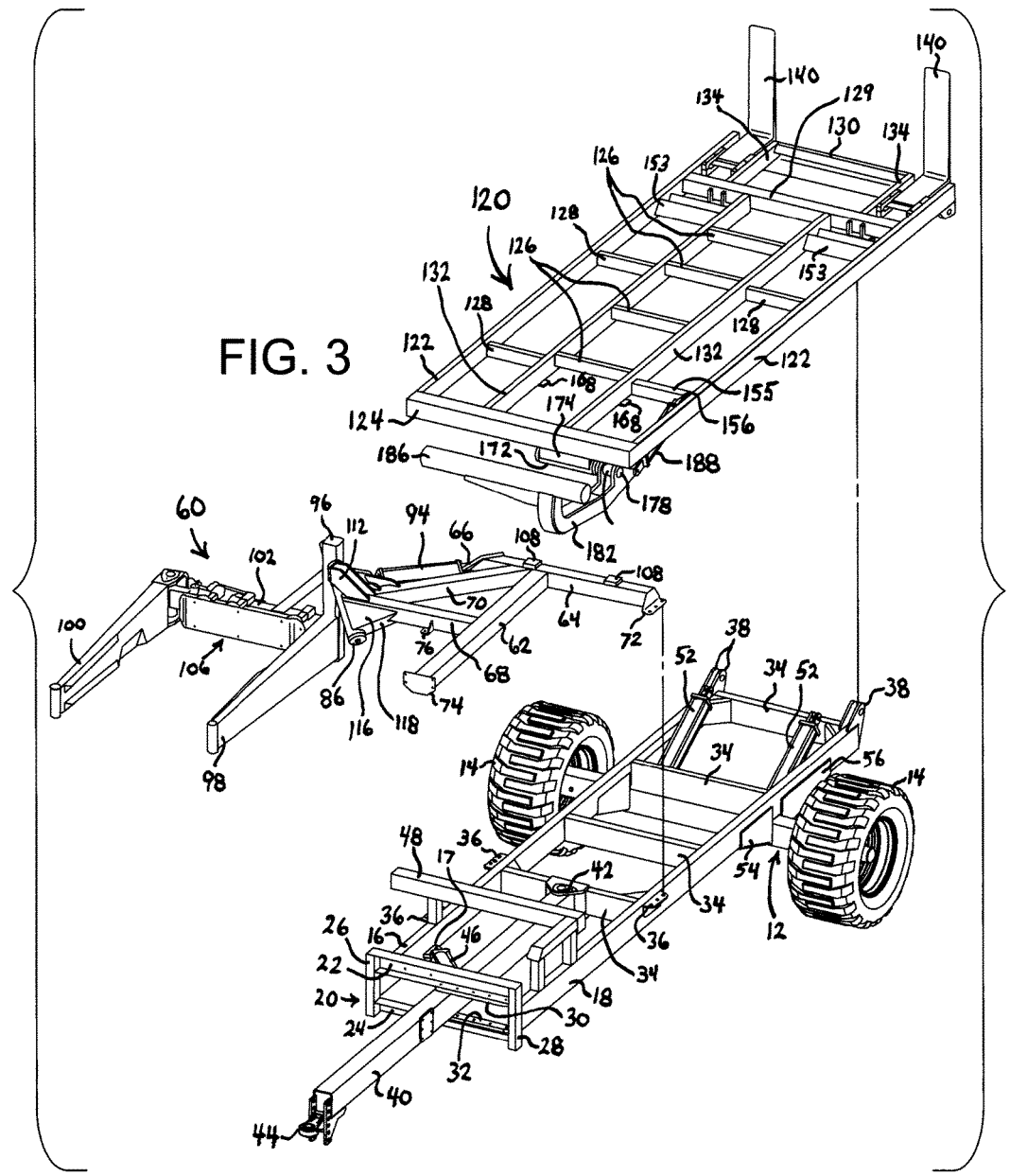
FIG. 3 is a partially exploded perspective view from above the left front of the mid-size or big bale stack bed wagon 8 shown in FIG. 1 showing the loader arm assembly 60 in the arm down position, showing the stack bed assembly 120 in the bed down position, and showing the bale pushback and stack clamping assembly 170 in the clamp down position (central upper bed skin panels not shown to allow viewing of invention elements that would otherwise be obscured)
Figure 4:
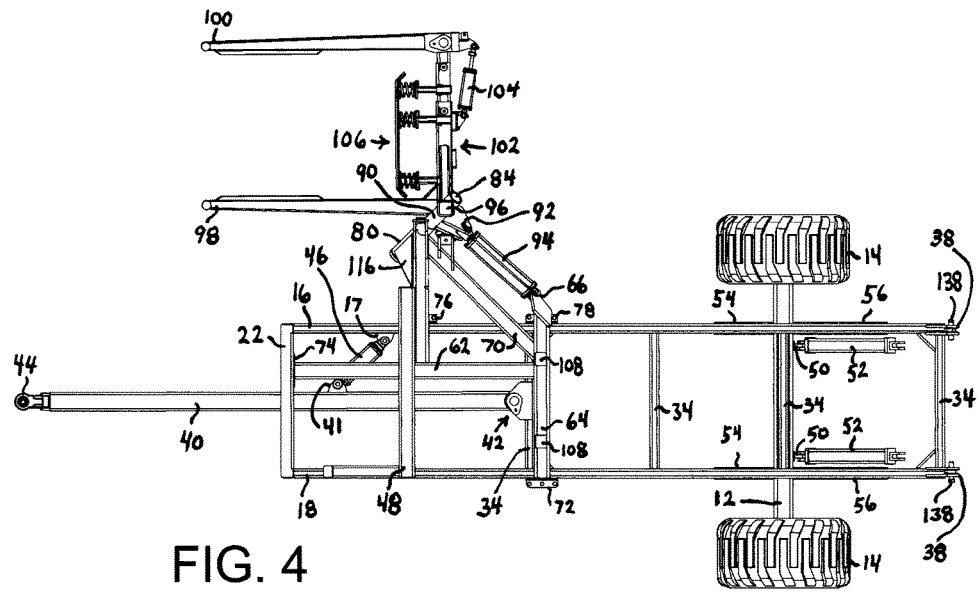
FIG. 4 is a top plan view of the loader arm assembly 60 attached by nuts and bolts to a lower support frame assembly both shown in FIG. 1 showing the wagon draw bar 40 aligned right to left with the longitudinal center axis of the wagon and showing the loader arm assembly in the arm down position (a bale receiving position)(the stack bed assembly is not shown)
Figure 5:
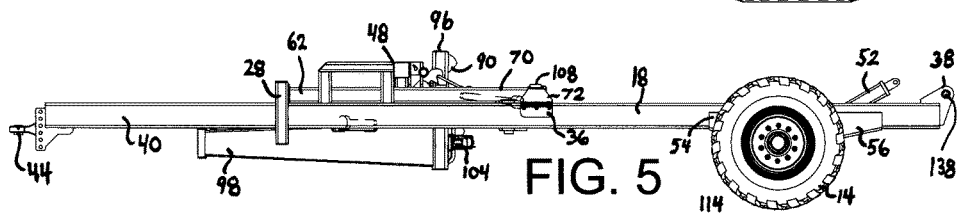
FIG. 5 is a left side plan view of the bale loader arm assembly 60 attached by nuts and bolts to the lower support frame assembly 10 both shown in FIG. 1 (the stack bed assembly is not shown)
Figure 6:
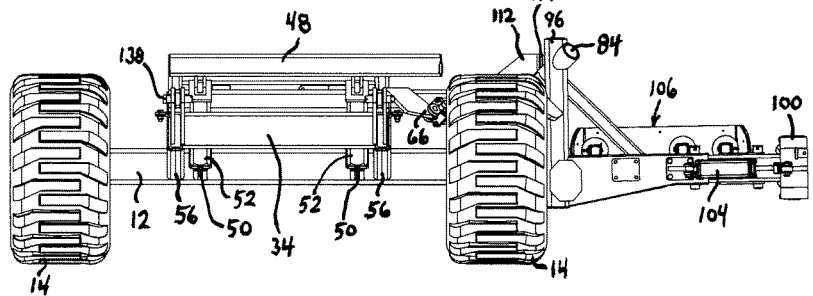
FIG. 6 is a rear plan view of the loader arm assembly 60 attached by nuts and bolts to the lower support frame assembly 10 both shown in FIG. 1 showing the loader arm assembly in the arm down position (the stack bed assembly is not shown)
Figure 7:
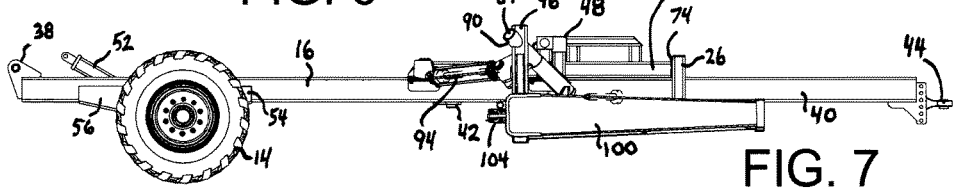
FIG. 7 is a right side plan view of the loader arm assembly 60 attached by nuts and bolts to the lower support frame assembly 10 both shown in FIG. 1 (the stack bed assembly is not shown)
Figure 8:
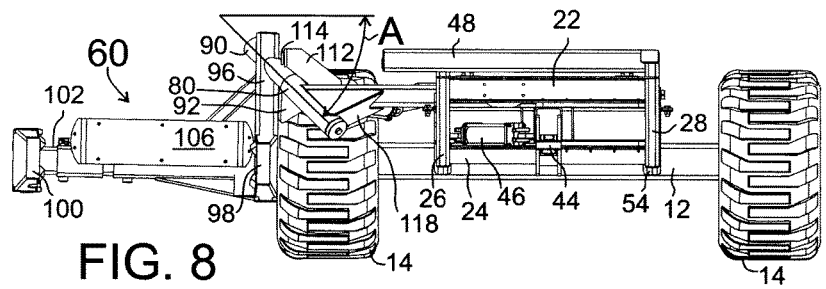
FIG. 8 is a front plan view of the loader arm assembly 60 attached by nuts and bolts to the lower support frame assembly 10 both shown in FIG. 1 (the stack bed assembly is not shown), and showing an angle A that identifies an upper sleeve 90 and a coaxial lower sleeve 80 descend upper left to lower right at 45 degrees down from a horizontal plane spaced above the ground and parallel to a horizontal plane of said stack bed assembly when in the bed down position.
Figure 9:
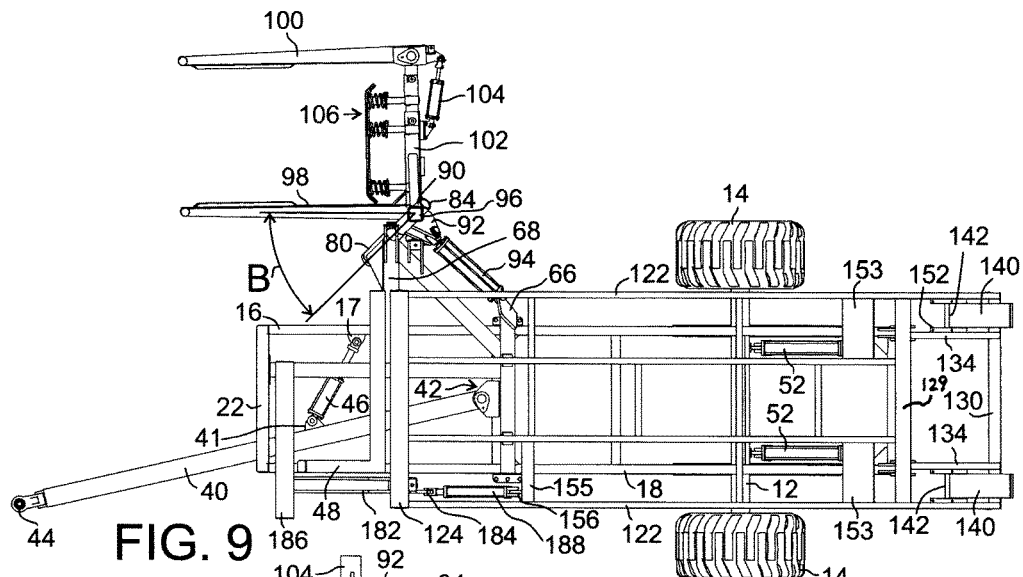
FIG. 9 is a top plan view of the stack bed wagon 8 shown in FIG. 1 showing the wagon draw bar 40 aligned at a selected angle to the left from the longitudinal center axis of the wagon and showing the loader arm assembly 60 in the arm down position, showing the stack bed assembly 120 in the bed down position, and showing the bale pushback and stack clamping assembly 170 in the clamp down position (central upper bed skin panels not shown to allow viewing of invention elements that would otherwise be obscured), and showing an angle B that identifies said upper sleeve 90 and said coaxial lower sleeve 80, and a coaxial loader arm pivot shaft 84 angle from right rear to left front at 45 degrees toward the longitudinal center line of said wagon.
Figure 10:
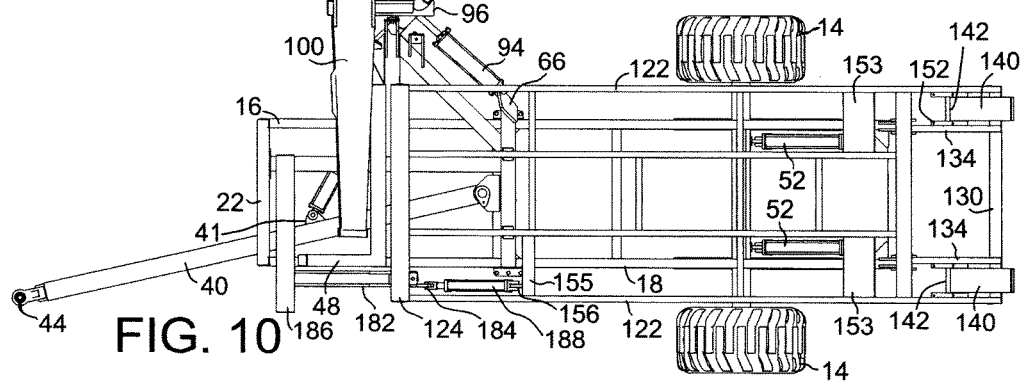
FIG. 10 is a top plan view of the stack bed wagon 8 shown in FIG. 9 showing the loader arm assembly 60 in the arm up position (a bale delivery to stack bed position), showing the stack bed assembly 120 in the bed down position, and showing the bale pushback and stack clamping assembly 170 in the clamp down position (central upper bed skin panels not shown to allow viewing of elements that would otherwise be obscured)
Figure 11:
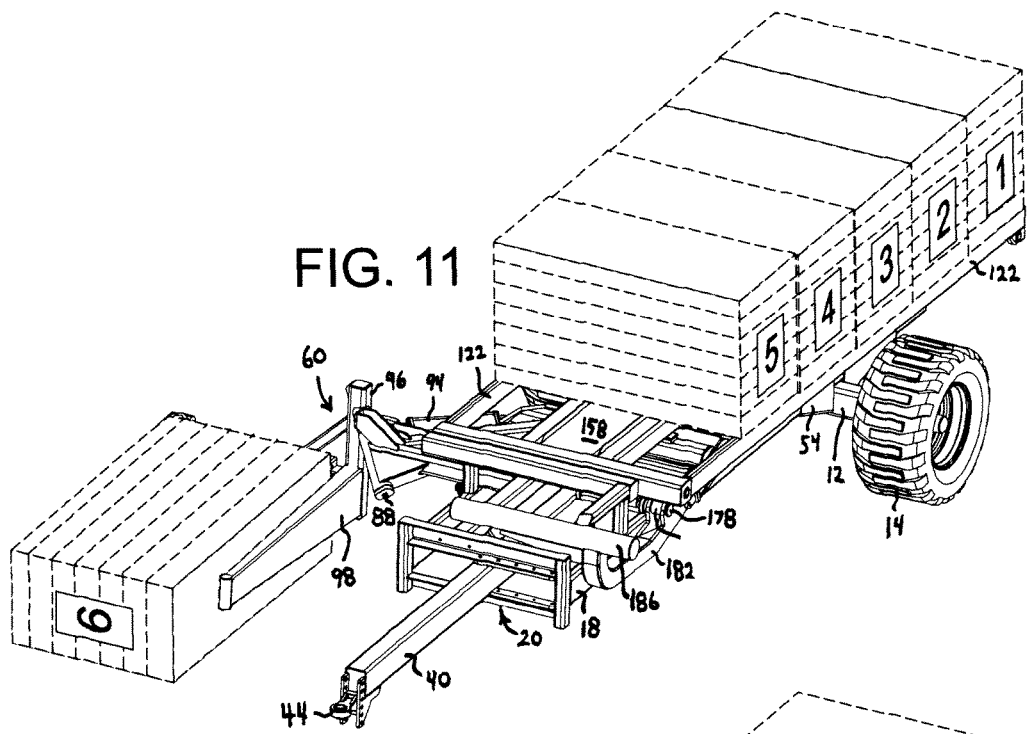
FIG. 11 is a perspective view from above the left front quarter of the mid-size or big bale stack bed wagon 8 shown in FIG. 9 showing the wagon draw bar 40 aligned right to left with the longitudinal center axis of the wagon and showing the loader arm assembly 60 in the arm down position clamping a representative bale 6, showing the stack bed assembly 120 holding representative bales 1 to 5 in the bed down position, and showing the bale pushback and stack clamping assembly 170 in the clamp down position.
Figure 12:
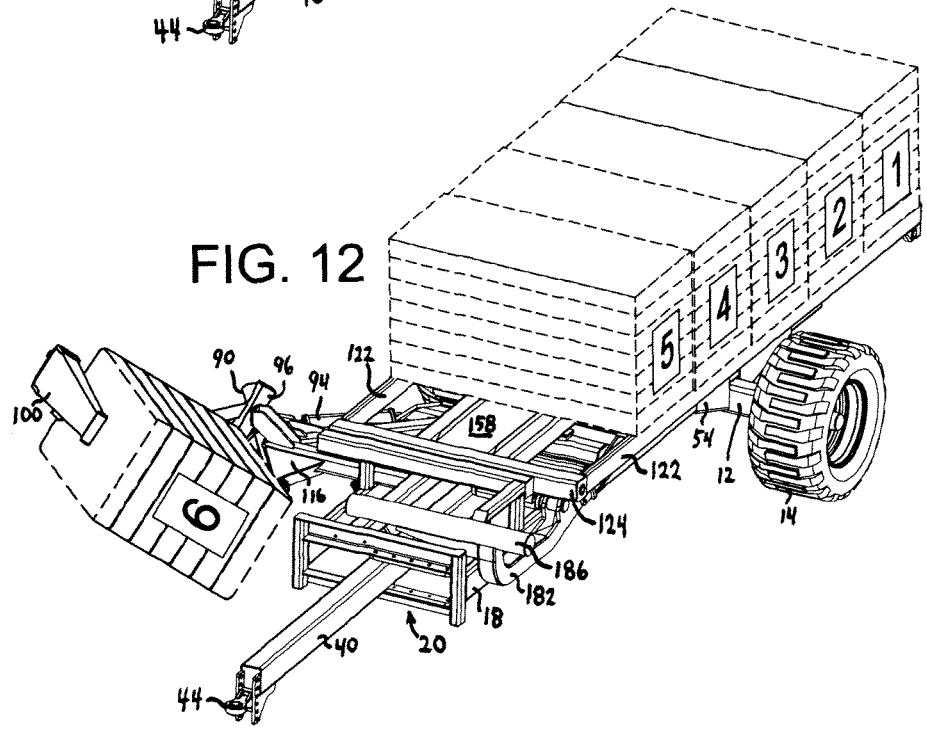
FIG. 12 is a perspective view from above the left front quarter of the mid-size or big bale stack bed wagon 8 shown in FIG. 11 showing the wagon draw bar 40 aligned right to left with the longitudinal center axis of the wagon and showing the loader arm assembly 60 in an intermediate position clamping a representative bale 6, showing representative bales 1 to 5 on the stack bed assembly 120 in the bed down position, and showing the bale pushback and stack clamping assembly 170 in the clamp down position.
Figure 13:
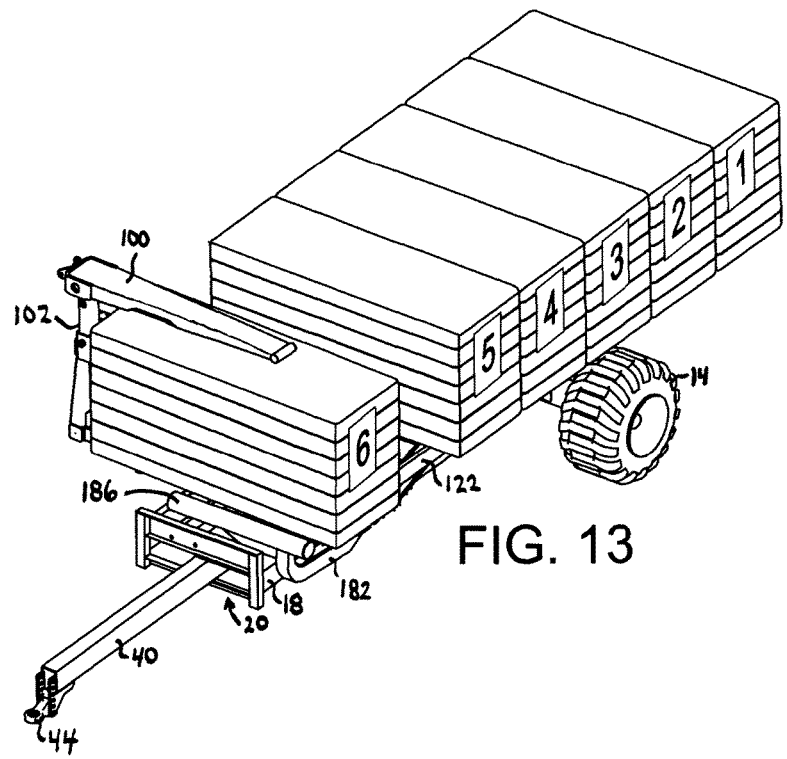
FIG. 13 is a perspective view from above the left front quarter of the mid-size or big bale stack bed wagon 8 shown in FIG. 12 showing the wagon draw bar 40 aligned right to left with the longitudinal center axis of the wagon and showing the loader arm assembly 60 in the arm up position clamping a representative bale 6, showing representative bales 1 to 5 on the stack bed assembly 120 in the bed down position, and showing the bale pushback and stack clamping assembly 170 in the clamp down position.
Figure 14:
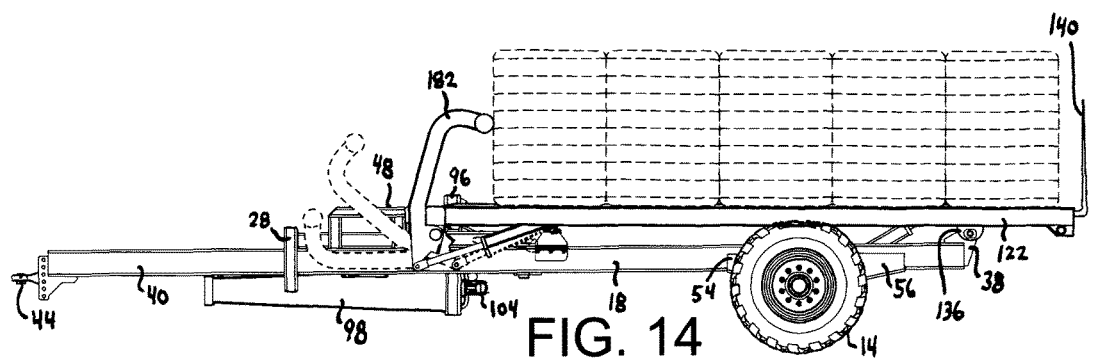
FIG. 14 is a left side plan view of the mid-size or big bale stack bed wagon 8 shown in FIG. 12 showing the loader arm assembly 60 in the arm down position, showing representative bales 1 to 5 on the stack bed assembly 120 in the bed down position, and showing the bale pushback and stack clamping assembly 170 in the clamp up position; and showing in dashed lines the clamping assembly in the clamp down position and in a clamp intermediate position.
Figure 15:
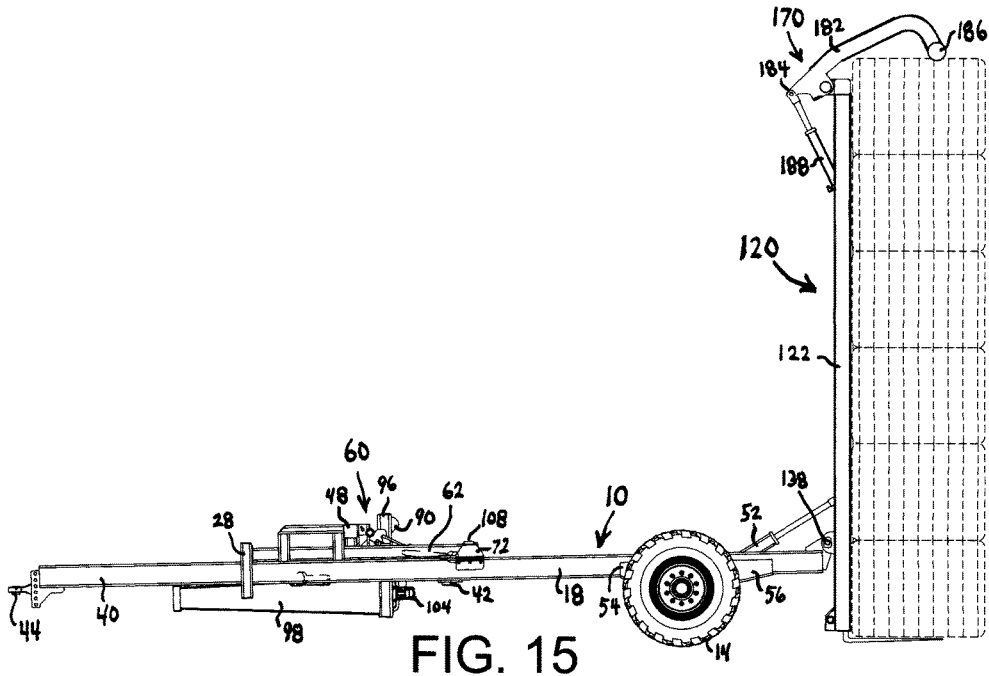
FIG. 15 is a left side plan view of the mid-size or big bale stack bed wagon 8 showing the loader arm assembly 60 in the arm down position, showing the stack bed assembly 120 elevated to the bed up position and a stack load of representative bales 1 to 6, and showing the bale pushback and stack clamping assembly 170 in a clamping position.
Figure 16:
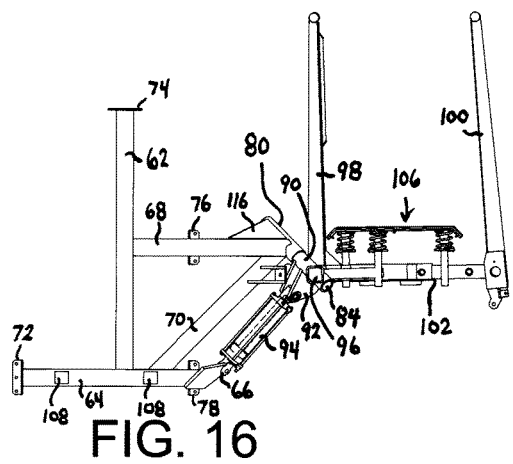
FIG. 16 is a top plan view of the loader arm assembly 60 shown in FIG. 3 showing the loader arm assembly in the arm down position.
Figure 17:
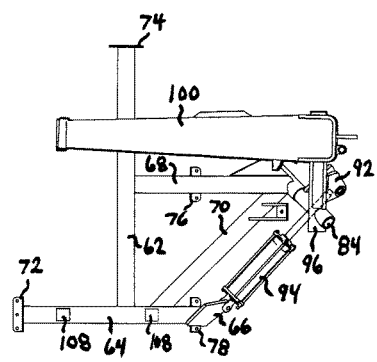
FIG. 17 is a top plan view of the loader arm assembly 60 shown in FIG. 16 showing the loader arm assembly in the arm up position.
Figure 18:
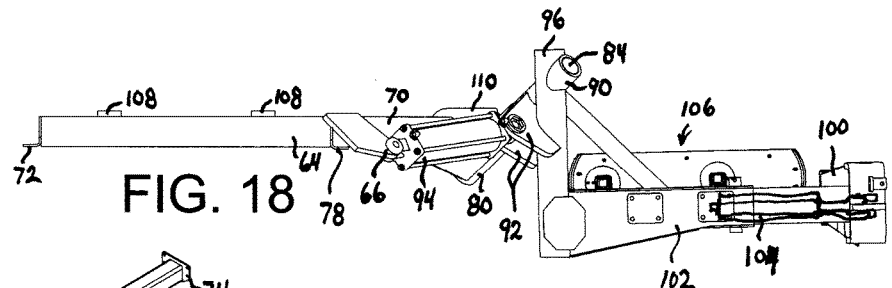
FIG. 18 is a rear plan view of the loader arm assembly 60 shown in FIG. 16 showing the loader arm assembly in the arm down position.

Referring to FIGS. 1 to 35, the present invention is a novel mid-size or big bale stack bed wagon 8 that incorporates a novel bale loader arm assembly 60.

Figure 19:
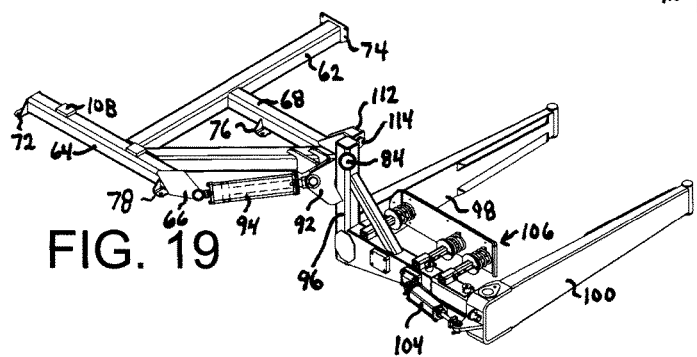
FIG. 19 is a perspective view from above and the right side of the loader arm assembly 60 shown in FIG. 16 looking down along the longitudinal center axis of the loader arm pivot shaft 84 and showing the loader arm assembly in the arm down position and a loader arm vertical post 96 pointing down at a six o'clock position.
Figure 20:
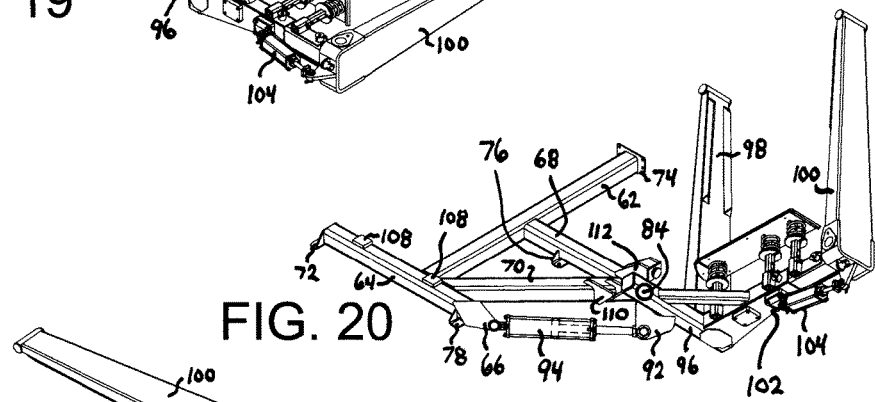
FIG. 20 is a perspective view from above and the right side of the loader arm assembly 60 shown in FIG. 19 looking down along the longitudinal center axis of the loader arm pivot shaft 84 and showing the loader arm assembly in an arm intermediate position rotated about the longitudinal center axis of the arm pivot shaft about sixty (60) degrees and the loader arm vertical post 96 pointing at a four o'clock position.
Figure 21:
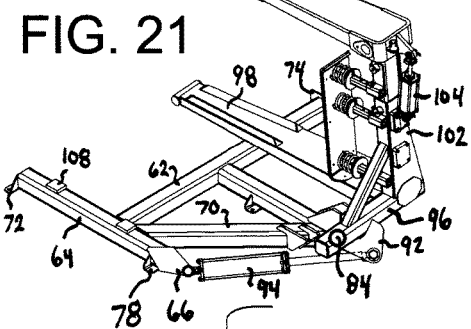
FIG. 21 is a perspective view from above and the right side of the loader arm assembly 60 shown in FIG. 19 looking down along the longitudinal center axis of the loader arm pivot shaft 84 and showing the loader arm assembly in an arm up position rotated about the longitudinal center axis of the arm pivot shaft about 124 degrees and the loader arm vertical post 96 pointing at a two o'clock position.
Figure 22:
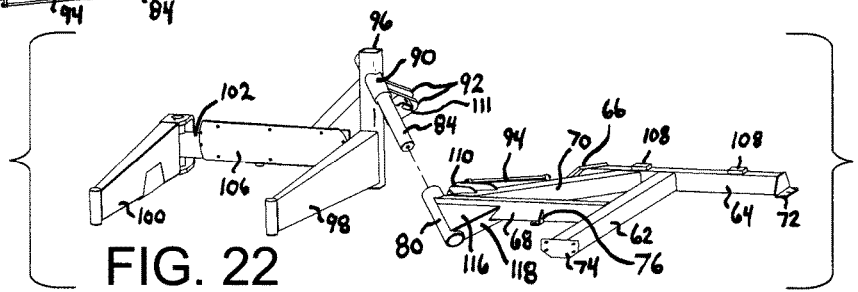
FIG. 22 is a partially exploded perspective view from above and the left side of the loader arm assembly 60 showing the loader arm assembly in the arm down position and the arm pivot shaft 84 aligned for coaxial insertion into a loader arm pivot shaft lower sleeve 80.
Figure 23:
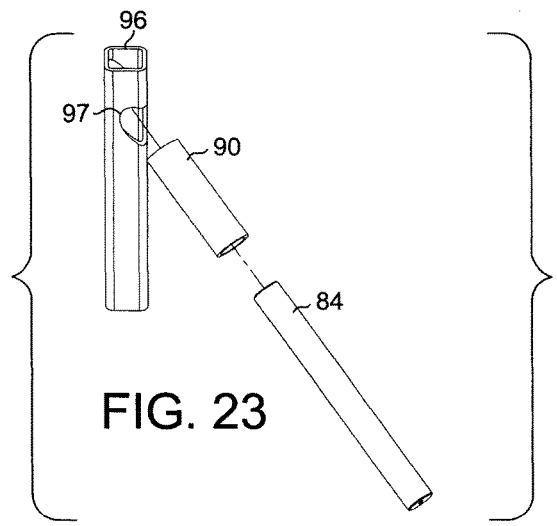
FIG. 23 is an exploded perspective view from above and forward of a loader arm vertical post 96, and showing the vertical post, a vertical post pivot shaft bore 97, a loader arm pivot shaft upper sleeve 90, and the loader arm pivot shaft 84; said bore, said upper sleeve, and said pivot shaft are coaxial.
Figure 24:
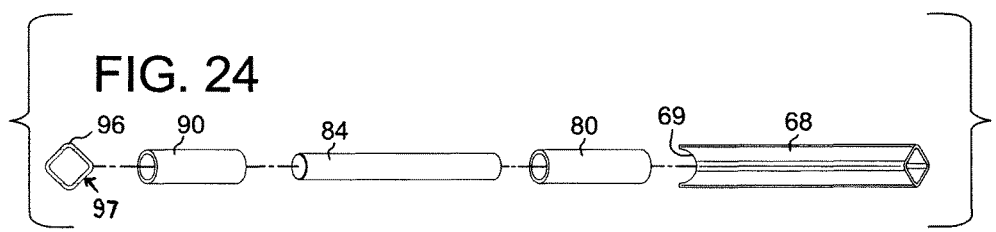
FIG. 24 is an exploded top plan view of the loader arm vertical post 96, the vertical post pivot shaft bore 97, the loader arm pivot shaft upper sleeve 90, the loader arm pivot shaft 84 shown in FIG. 23, a loader arm pivot shaft lower sleeve 80, and a front cross pivot support rail 68 having a coped rail end 69 (coped profile) to be attached to said lower sleeve; said bore, said upper sleeve, said pivot shaft, and said lower sleeve are coaxial.
Figure 25:
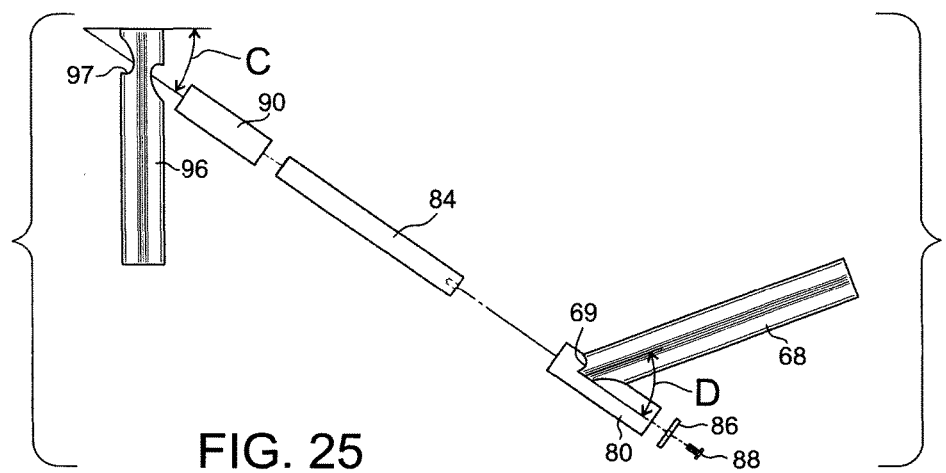
FIG. 25 is a partially exploded side plan view of the loader arm vertical post 96, the pivot shaft bore 97, the loader arm pivot shaft upper sleeve 90, the pivot shaft 84, the loader arm pivot shaft lower sleeve 80, and the front cross pivot support rail 68 and the coped rail end 69 attached to said lower sleeve shown in FIG. 24 and showing the preferred angle C of the pivot shaft bore (the intersection of the upper sleeve to the vertical post) is 35 degrees down from a horizontal plane across the upper end of the vertical post to the longitudinal center axis of the pivot shaft bore, said horizontal plane is perpendicular to the longitudinal center axis of the vertical post, said bore intersects the vertical post descending diagonally left to right through opposite cata-corner corners of the generally square profile at the upper end of the vertical post, and showing the preferred angle D of intersection of the coped rail end 69 descending diagonally left to right across opposite catacorner corners of the generally square profile pivot shaft rail to the pivot shaft lower sleeve is 55 degrees between the longitudinal center axes of the lower sleeve and the pivot support rail.
Figure 30:
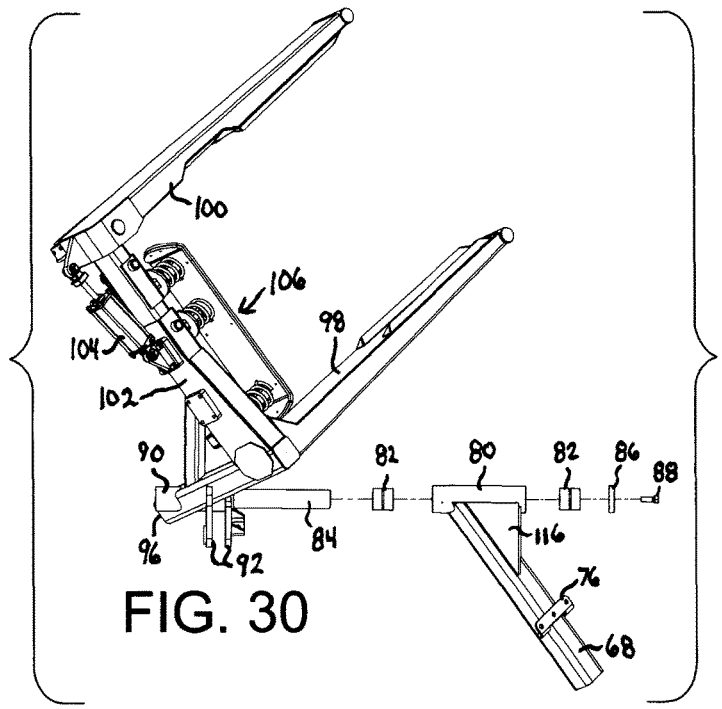
FIG. 30 is a partially exploded perspective view from below of the loader arm assembly 60 shown in FIG. 3 and perpendicular to the coaxial longitudinal central axes of the upper sleeve 90, the arm pivot shaft 84, two loader arm pivot shaft bearings 82, the lower sleeve 80, a shaft retention cap 86, and a shaft retention bolt 88 (the upper sleeve, the shaft, the bearings, the lower sleeve, the retention cap, and the retention bolt are all coaxial along their longitudinal central axes)
Figure 31:
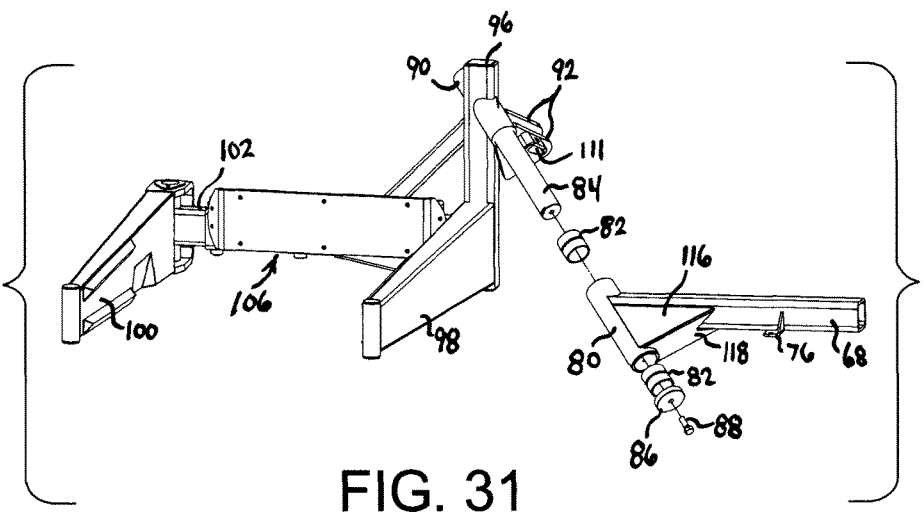
FIG. 31 is a partially exploded and partial perspective view from slightly above the left front of the loader arm assembly 60 shown in FIG. 30 showing the loader arm assembly in the arm down position and the arm pivot shaft 84 aligned for coaxial insertion into and through one of two bearings 82, the lower sleeve 80, two of two bearings 82, and to be rotatably secured within the lower sleeve by a retention cap 86, and a retention bolt 88.

The elements of the invention, a mid-size or big bale stack bed wagon 8 comprise:

a. a lower support frame assembly 10 comprising:

a flotation tire wheel and axle assembly 12 having attached at least two flotation tires 14 (said tires coaxial and attached at opposite ends of said axle assembly), a longitudinal right main rail 16 spaced from a longitudinal left main rail 18, said main rails transversely attached to and supported by said axle assembly, a main rail actuator ear 17 attached to a forward portion of said right main rail between said main rails;

a front cross open frame 20 transversely attached to and bridging between the forward ends of said main rails, said front cross open frame comprising: an upper cross frame rail 22 spaced from a lower cross frame rail 24, said frame rails attached to and bridging between the respective upper ends and lower ends of both a right cross frame post 26 and a left cross frame post 28, said frame posts spaced one from the other, an upper cross frame pad 30 spaced from a lower cross frame pad 32, said frame pads (preferably made from a low friction UHMW plastic sheet material) attached to facing portions of said upper cross frame rail and said lower cross frame rail;

a plurality of lower support cross members 34 behind said cross frame distributed and transversely attached to and between said main rails;

a plurality of loader arm assembly mounting flanges 36 attached to selected upper outer forward portions of said main rails;

two spaced pairs of stack bed assembly mounting pivot ears 38 attached to outer rear portions of said main rails;

a longitudinal wagon draw bar 40 having a draw bar actuator ear 41 attached to a forward portion of said draw bar, said draw bar slidingly received between said frame rails and closely adjacent and between said frame pads and pivotally mounted between said main rails and to a draw bar mount 42 that is attached to a forward middle portion of the first said lower support cross member behind said cross frame;

a wagon hitch 44 attached to the distal forward end of said draw bar for attaching said wagon to a prime mover (a farm tractor);

a draw bar angle adjustment actuator 46 operatively attached to and between said main rail actuator ear and said draw bar actuator ear, said angle adjustment actuator to selectively rotate said draw bar in a horizontal plane;

a preferably reverse L-shaped picked-up bale support 48 having a longitudinal leg portion attached to a forward upper portion of the left main rail and having a transverse leg portion attached to an forward upper portion of said right main rail; a pair of spaced stack bed main actuator mounting ears 50 attached to said axle assembly;

a pair of spaced stack bed main actuators 52 pivotally attached to said main actuator mounting ears;

preferably a respective closely fitted main rail front reinforcing glove 54 is attached to each respective said main rail forward to said axle assembly;

preferably a respective closely fitted main rail rear reinforcing glove 56 is attached to each respective said main rail forward to said axle assembly;

B. a bale loader arm assembly 60 attached to said lower support frame assembly (preferably attached using nuts and bolts with cooperating flanges and brackets), said bale loader arm assembly comprising:

a main longitudinal loader rail 62 at its front end having an arm assembly mounting bracket 74 attached and said mounting bracket 74 attached to said upper cross frame rail, and said longitudinal loader rail attached preferably perpendicularly to a rear loader cross rail 64 having an arm rotation actuator mounting ear 66 attached at the right end of said cross rail;

a front cross pivot support rail 68 spaced forward from the right end of said cross rail, said pivot support rail having a coped rail end 69 (coped profile) away from said longitudinal loader rail;

a loader diagonal rail 70 attached to and between said cross rail and said pivot support rail;

a plurality of arm assembly mounting brackets 72, 74, 76, 78 selectively distributed and attached to lower outer surfaces of said loader arm assembly to cooperatively connect to said arm assembly mounting flanges of said lower support frame assembly including attachment by said bracket 74 attached to said upper cross frame 22 (all attachments between brackets and flanges preferably are made using nuts and bolts);

a loader arm pivot shaft lower sleeve 80 attached to said coped rail end, said lower sleeve oriented at 45 degrees from the rear to the front of said sleeve and angled from right to left toward the longitudinal center axis of said wagon and oriented down 35 degrees from the general horizontal plane of the wagon from the rear upper end to the front lower end of said sleeve;

preferably two loader arm pivot shaft bearings 82 are inserted and retained in said lower sleeve, and said lower sleeve and said bearings sized to closely receive and retain a coaxial loader arm pivot shaft 84 inserted and retained in said lower sleeve and said bearings;

a shaft retention cap 86 to secure the lower end of said lower sleeve to retain said pivot shaft within said lower sleeve, said retention cap attached to said pivot shaft by a coaxial shaft retention bolt 88;

a loader arm pivot shaft upper sleeve 90 coaxial to and diagonally above and rearward from said lower sleeve, said upper sleeve sized to closely receive and retain an upper portion of said pivot shaft (preferably the upper sleeve is attached by welding to the upper end of said pivot shaft);

a pair of loader arm rotation actuator sleeve mounting ears 92 attached to an outer portion of said upper sleeve;

a loader arm rotation actuator 94 operatively attached to and between said rotation actuator mounting ear and said sleeve mounting ears;

a loader arm vertical post 96 having a vertical post pivot shaft bore 97 sized to receive and retain an upper portion of said upper sleeve, said vertical post depending generally downward, said vertical post attached to said upper sleeve preferably with said upper sleeve inserted into said pivot shaft bore that angles diagonally at 45 degrees across the post and 35 degrees down from horizontal (see FIGS. 23 and 25) to the sleeve center axis, said bore located towards the upper end of said vertical post;

a clamping arm connecting assembly 102 attached to the bottom end of said vertical post and said connecting assembly extending outward away from said post;

an inwardly disposed inner bale clamping arm 98 spaced from a pivoting outer bale clamping arm 100 said clamping arms attached to opposite ends of said connecting assembly;

a clamping arm actuator 104 operatively attached to and between said connecting assembly and said pivoting outer bale clamping arm;

an adjustable bale stop assembly 106 attached to said connecting assembly and located between said clamping arms;

a plurality of stack bed contact pads 108 attached to selected upper surfaces of said rear cross rail to contact selected portions of a stack bed assembly rotatably attached above said rear cross rail;

an arm down pivot stop 110 attached to an outer portion of said diagonal rail positioned to contact a sleeve mounting ear stop 111 (see FIGS. 22 and 31 (preferably a contact pad is attached to one or both of the stops to cushion the contact between the stops) (contact pad not shown in FIGS. 22 and 31);

an arm up pivot stop 112 preferably is attached to an upper portion of said pivot support rail near said coped rail end;

a pivot stop contact pad 114 can be attached to said pivot stops (see FIG. 19);

lower sleeve cheek gussets 116 preferably attached between said lower sleeve and said pivot support rail (see FIGS. 26 to 29); and a lower sleeve face gusset 118 preferably attached between said lower sleeve and said pivot support rail (see FIGS. 26 to 29);

C. a stack bed assembly 120 comprising:

two spaced longitudinal outer bale support rails 122;

two longitudinal front inner support rails 132 spaced between forward portions of said outer bale support rails;

a stack bed front cross beam 124 attached to and across the front ends of said outer bale support rails and said front inner support rails;

a plurality of stack bed cross members 126, 128 attached to and between said support rails;

a stack bed intermediate cross beam 129 attached to and across the rear ends of said outer bale support rails and said front inner support rails;

a stack bed rear cross beam 130 attached across the rear ends of said outer bale support rails;

two spaced longitudinal rear inner support members 134 inside said outer bale support rails attached to and between said stack bed rear cross member and said stack bed intermediate cross beam;

a pair of spaced stack bed mounting pivot ears 136 attached to said stack bed intermediate cross beam;

two stack bed mounting pivot pins 138 inserted and retained in cooperating said stack bed assembly mounting pivot ears and said stack bed mounting pivot ears to pivotably join said lower support frame to said stack bed assembly;

two generally L-shaped stack bed rear bale retention forks 140 (having capacity for limited fore and aft movement) attached to selected portions of the rear portions of said bale support rails with each fork having the upper leg extending above the horizontal plane of said bale support rails, having the lower leg extending forward of the upper leg, and each fork having a fork pivot dowel 142 attached transversely across the distal end of the lower leg of the L-shape with said dowel extending beyond the transverse profile of the lower leg to engage and be moveably retained within a fork retention means 148 (preferably a pair of retention slots 150 defined by opposing and cooperating generally C-shaped slot defining members 152 attached to the stack bed towards the said rear cross member with said slots allowing some fore and aft movement of the dowel ends and the fork along the longitudinal axis of the bed);

a fork hold-down crook 144 attached to the lower surface of each said fork to moveably interact with a retention bar 146 transversely attached to said stack bed rear cross member;

two main actuator mounting cross members 153 attached to and between respectively one of said outer bale support rails and the respective facing said front inner support rails;

two pairs of spaced stack bed elevating ears 154 attached to selected lower portions of said actuator mounting cross members and said elevating ears pivotably attached to the distal ends of said main actuators;

a pushback actuator mounting cross member 155 spaced rearward from said stack bed front cross beam and attached to and between said left outer bale support rail and the adjacent facing front inner support rail; and a pushback pivot ear 156 attached to a selected lower portion of said pushback actuator mounting cross member;

one or more central upper bed skin panels 158 each said skin panel preferably having a plurality of longitudinal raised bale directing ridges 160; and a plurality of loader interstitial contact pads 168 attached to the underside of said inner support rails to contact said stack bed contact pads; and D. a bale pushback and stack clamping assembly 170 comprising:

a pushback pivot mounting sleeve 172 attached to and spaced from and below a left portion of said stack bed front cross beam;

a mounting sleeve cheek gusset 174 preferably attached to and between said pivot mounting sleeve and said stack bed front cross beam;

said pivot mounting sleeve sized to rotatably receive and retain coaxially a pair of pushback pivot shaft bearings 176 and a pushback pivot shaft 178 (the rotational axis of said pushback pivot shaft is transverse to the longitudinal axis of said bale support rails);

one or more pushback pivot arms 182 (preferably J-shaped) attached at their lower ends (the top of the J-shape) to said pushback pivot shaft;

a pushback actuator mounting ear 184 attached to one of said pushback arms;

a bale pushback cross member 186 attached to said pushback arms preferably spaced forward and above said pushback pivot shaft;

a pushback actuator 188 operatively attached between said pushback assembly pivot ear and said pushback actuator mounting ear;

a pushback shaft retention cap 190; and a pivot shaft retention bolt 192 to rotatably secure said pushback pivot shaft within said pushback pivot mounting sleeve.

The six actuators of the invention are powered preferably by a hydraulic system of the vehicle that is pulling the stack bed wagon and the hydraulic lines are not shown to allow a clearer viewing of the structural elements of the invention. A majority of the structural components of the invention are preferably made from sheet steel stock, round or square steel tubing stock, or suitable materials used in making the preexisting bale wagons. Means of joining of elements of the invention one to another preferably may include welding.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. A mid-size or big bale stack bed wagon comprising:

A. a lower support frame assembly comprising:

a flotation tire wheel and axle assembly having attached at least two flotation tires, a longitudinal right main rail spaced from a longitudinal left main rail, said main rails transversely attached to and supported by said axle assembly, a main rail actuator ear attached to a forward portion of said right main rail between said main rails;

a front cross open frame transversely attached to and bridging between the forward ends of said main rails, said front cross open frame comprising: an upper cross frame rail spaced from a lower cross frame rail, said frame rails attached to and bridging between the respective upper ends and lower ends of both a right cross frame post and a left cross frame post, said frame posts spaced one from the other, an upper cross frame pad spaced from a lower cross frame pad, said frame pads made from a low friction UHMW plastic sheet material attached to facing portions of said upper cross frame rail and said lower cross frame rail;

a plurality of lower support cross members behind said cross frame distributed and transversely attached to and between said main rails;

a plurality of loader arm assembly mounting flanges attached to selected upper outer forward portions of said main rails;

two spaced pairs of stack bed assembly mounting pivot ears attached to outer rear portions of said main rails;

a longitudinal wagon draw bar having a draw bar actuator ear attached to a forward portion of said draw bar, said draw bar slidingly received between said frame rails and closely adjacent and between said frame pads and pivotally mounted between said main rails and to a draw bar mount that is attached to a forward middle portion of the first said lower support cross member behind said cross frame;

a wagon hitch attached to the distal forward end of said draw bar for attaching said wagon to a prime mover;

a draw bar angle adjustment actuator operatively attached to and between said main rail actuator ear and said draw bar actuator ear, said angle adjustment actuator to selectively rotate said draw bar in a horizontal plane;

a reverse L-shaped picked-up bale support having a longitudinal leg portion attached to a forward upper portion of said left main rail and having a transverse leg portion attached to a forward upper portion of said right main rail;

a pair of spaced stack bed main actuator mounting ears attached to said axle assembly;

a pair of spaced stack bed main actuators pivotally attached to said main actuator mounting ears;

B. a bale loader arm assembly attached to said lower support frame assembly, said bale loader arm assembly comprising:

a main longitudinal loader rail at its front end having an arm assembly mounting bracket attached and said mounting bracket attached to said upper cross frame rail, and said longitudinal loader rail attached to a rear loader cross rail having an arm rotation actuator mounting ear attached at the right end of said cross rail;

a front cross pivot support rail spaced forward from the right end of said cross rail, said pivot support rail having a coped rail end away from said longitudinal loader rail;

a loader diagonal rail attached to and between said cross rail and said pivot support rail;

a plurality of arm assembly mounting brackets selectively distributed and attached to lower outer surfaces of said loader arm assembly and cooperatively connected to said arm assembly mounting flanges of said lower support frame assembly;

a loader arm pivot shaft lower sleeve attached to said coped rail end, said lower sleeve oriented at 45 degrees from the rear to the front of said sleeve and angled from right to left toward the longitudinal center axis of said wagon and oriented down 35 degrees from the general horizontal plane of the wagon from the rear upper end to the front lower end of said sleeve;

two loader arm pivot shaft bearings are inserted and retained in said lower sleeve, and said lower sleeve and said bearings sized to closely receive and retain a coaxial loader arm pivot shaft inserted and retained in said lower sleeve and said bearings;

a shaft retention cap to secure the lower end of said lower sleeve to retain said pivot shaft within said lower sleeve, said retention cap attached to said pivot shaft by a coaxial shaft retention bolt;

a loader arm pivot shaft upper sleeve coaxial to and diagonally above and rearward from said lower sleeve, said upper sleeve sized to closely receive and retain an inserted coaxial upper portion of said pivot shaft, said upper sleeve attached to said upper portion of said pivot shaft;

a pair of loader arm rotation actuator sleeve mounting ears attached to an outer portion of said upper sleeve;

a loader arm rotation actuator operatively attached to and between said rotation actuator mounting ear and said sleeve mounting ears;

a loader arm vertical post having a vertical post pivot shaft bore sized to receive and retain an upper portion of said upper sleeve, said vertical post depending generally downward, said vertical post attached to said upper sleeve with said upper sleeve inserted into said pivot shaft bore that angles diagonally at 45 degrees across the post and 35 degrees down from horizontal to the sleeve center axis, said bore located towards the upper end of said vertical post;

a clamping arm connecting assembly attached to the bottom end of said vertical post and said connecting assembly extending outward away from said post;

an inwardly disposed inner bale clamping arm spaced from a pivoting outer bale clamping arm said clamping arms attached to opposite ends of said connecting assembly; and a clamping arm actuator operatively attached to and between said connecting assembly and said pivoting outer bale clamping arm;

C. a stack bed assembly comprising:

two spaced longitudinal outer bale support rails;

two longitudinal front inner support rails spaced between forward portions of said outer bale support rails;

a stack bed front cross beam attached to and across the front ends of said outer bale support rails and said front inner support rails;

a plurality of stack bed cross members attached to and between said support rails;

a stack bed intermediate cross beam attached to and across the rear ends of said outer bale support rails and said front inner support rails;

a stack bed rear cross beam attached across the rear ends of said outer bale support rails;

two spaced longitudinal rear inner support members inside said outer bale support rails attached to and between said stack bed rear cross member and said stack bed intermediate cross beam;

a pair of spaced stack bed mounting pivot ears attached to said stack bed intermediate cross beam;

two stack bed mounting pivot pins inserted and retained in cooperating said stack bed assembly mounting pivot ears and said stack bed mounting pivot ears to pivotably join said lower support frame to said stack bed assembly;

two generally L-shaped stack bed rear bale retention forks attached to selected portions of the rear portions of said bale support rails with each fork having the upper leg extending above the horizontal plane of said bale support rails, having the lower leg extending forward of the upper leg, and each fork having a fork pivot dowel attached transversely across the distal end of the lower leg of the L-shape with said dowel extending beyond the transverse profile of the lower leg to engage and be moveably retained within a fork retention means;

a fork hold-down crook attached to the lower surface of each said fork to moveably interact with a retention bar transversely attached to said stack bed rear cross member;

two main actuator mounting cross members attached to and between respectively one of said outer bale support rails and the respective facing said front inner support rails;

two pairs of spaced stack bed elevating ears attached to selected lower portions of said actuator mounting cross members and said elevating ears pivotably attached to the distal ends of said main actuators;

a pushback actuator mounting cross member spaced rearward from said stack bed front cross beam and attached to and between said left outer bale support rail and the adjacent facing front inner support rail;

a pushback pivot ear attached to a selected lower portion of said pushback actuator mounting cross member; and one or more central upper bed skin panels attached to upper surfaces of said support rails; and D. a bale pushback and stack clamping assembly comprising:

a pushback pivot mounting sleeve attached to and spaced from and below a left portion of said stack bed front cross beam;

said pivot mounting sleeve sized to rotatably receive and retain coaxially a pair of pushback pivot shaft bearings and a pushback pivot shaft having a rotational axis transverse to the longitudinal axis of said bale support rails;

one or more pushback pivot arms attached at their lower ends to said pushback pivot shaft;

a pushback actuator mounting ear attached to one of said pushback arms;

a bale pushback cross member attached to said pushback arms spaced forward and above said pushback pivot shaft;

a pushback actuator operatively attached between said pushback assembly pivot ear and said pushback actuator mounting ear;

a pushback shaft retention cap; and a pivot shaft retention bolt to rotatably secure said pushback pivot shaft within said pushback pivot mounting sleeve.

2. A stack bed wagon according to claim 1 wherein the longitudinal axis of said loader arm pivot shaft is angled at about 45 degrees toward the longitudinal axis of said vehicle and descending from rearward to forward at about 35 degrees from the horizontal plane of said stack bed assembly when in the bed down position.

3. A stack bed wagon according to claim 1 wherein the longitudinal axis of said loader arm pivot shaft is angled at about 45 degrees toward the longitudinal axis of said vehicle and descending from rearward to forward at between 32 and 38 degrees from the horizontal plane of said stack bed assembly when in the bed down position.

4. A stack bed wagon according to claim 1 wherein said clamping arms are generally coplanar and when in a bale depositing position are oriented generally in a vertical plane and parallel to each other and perpendicular to the longitudinal axis of said vehicle.

5. A stack bed wagon comprising:

A. a lower support frame assembly comprising:

a flotation tire wheel and axle assembly having attached at least two flotation tires, a longitudinal right main rail spaced from a longitudinal left main rail, said main rails transversely attached to and supported by said axle assembly, a main rail actuator ear attached to a forward portion of said right main rail between said main rails;

a front cross open frame transversely attached to and bridging between the forward ends of said main rails, said front cross open frame comprising: an upper cross frame rail spaced from a lower cross frame rail, said frame rails attached to and bridging between the respective upper ends and lower ends of both a right cross frame post and a left cross frame post, said frame posts spaced one from the other;

a plurality of lower support cross members behind said cross frame distributed and transversely attached to and between said main rails;

a plurality of loader arm assembly mounting flanges attached to selected upper outer forward portions of said main rails;

two spaced pairs of stack bed assembly mounting pivot ears attached to outer rear portions of said main rails;

a longitudinal wagon draw bar having a draw bar actuator ear attached to a forward portion of said draw bar, said draw bar slidingly received between said frame rails and pivotally mounted between said main rails and to a draw bar mount that is attached to a forward middle portion of the first said lower support cross member behind said cross frame;

a wagon hitch attached to the distal forward end of said draw bar for attaching said wagon to a prime mover;

a draw bar angle adjustment actuator operatively attached to and between said main rail actuator ear and said draw bar actuator ear, said angle adjustment actuator to selectively rotate said draw bar in a horizontal plane;

a reverse L-shaped picked-up bale support having a longitudinal leg portion attached to a forward upper portion of said left main rail and having a transverse leg portion attached to a forward upper portion of said right main rail;

a pair of spaced stack bed main actuator mounting ears attached to said axle assembly;

a pair of spaced stack bed main actuators pivotally attached to said main actuator mounting ears;

B. a bale loader arm assembly attached to said lower support frame assembly, said bale loader arm assembly comprising:

a main longitudinal loader rail at its front end having an arm assembly mounting bracket attached and said mounting bracket attached to said upper cross frame rail, and said longitudinal loader rail attached to a rear loader cross rail having an arm rotation actuator mounting ear attached at the right end of said cross rail;

a front cross pivot support rail spaced forward from the right end of said cross rail, said pivot support rail having a coped rail end away from said longitudinal loader rail;

a loader diagonal rail attached to and between said cross rail and said pivot support rail;

a plurality of arm assembly mounting brackets selectively distributed and attached to lower outer surfaces of said loader arm assembly and cooperatively connected to said arm assembly mounting flanges of said lower support frame assembly;

a loader arm pivot shaft lower sleeve attached to said coped rail end, said lower sleeve oriented at 45 degrees from the rear to the front of said sleeve and angled from right to left toward the longitudinal center axis of said wagon and oriented down 35 degrees from the general horizontal plane of the wagon from the rear upper end to the front lower end of said sleeve;

two loader arm pivot shaft bearings are inserted and retained in said lower sleeve, and said lower sleeve and said bearings sized to closely receive and retain a coaxial loader arm pivot shaft inserted and retained in said lower sleeve and said bearings;

a loader arm pivot shaft upper sleeve coaxial to and diagonally above and rearward from said lower sleeve, said upper sleeve sized to closely receive and retain an inserted coaxial upper portion of said pivot shaft, said upper sleeve attached to said upper portion of said pivot shaft;

a pair of loader arm rotation actuator sleeve mounting ears attached to an outer portion of said upper sleeve;

a loader arm rotation actuator operatively attached to and between said rotation actuator mounting ear and said sleeve mounting ears;

a loader arm vertical post having a vertical post pivot shaft bore sized to receive and retain an upper portion of said upper sleeve, said vertical post depending generally downward, said vertical post attached to said upper sleeve with said upper sleeve inserted into said pivot shaft bore that angles diagonally at 45 degrees across the post and 35 degrees down from horizontal to the sleeve center axis, said bore located towards the upper end of said vertical post;

a clamping arm connecting assembly attached to the bottom end of said vertical post and said connecting assembly extending outward away from said post;

an inwardly disposed inner bale clamping arm spaced from a pivoting outer bale clamping arm said clamping arms attached to opposite ends of said connecting assembly; and a clamping arm actuator operatively attached to and between said connecting assembly and said pivoting outer bale clamping arm;

C. a stack bed assembly comprising:

two spaced longitudinal outer bale support rails;

two longitudinal front inner support rails spaced between forward portions of said outer bale support rails;

a stack bed front cross beam attached to and across the front ends of said outer bale support rails and said front inner support rails;

a plurality of stack bed cross members attached to and between said support rails;

a stack bed intermediate cross beam attached to and across the rear ends of said outer bale support rails and said front inner support rails;

a stack bed rear cross beam attached across the rear ends of said outer bale support rails;

two spaced longitudinal rear inner support members inside said outer bale support rails attached to and between said stack bed rear cross member and said stack bed intermediate cross beam;

a pair of spaced stack bed mounting pivot ears attached to said stack bed intermediate cross beam;

two stack bed mounting pivot pins inserted and retained in cooperating said stack bed assembly mounting pivot ears and said stack bed mounting pivot ears to pivotably join said lower support frame to said stack bed assembly;

two generally L-shaped stack bed rear bale retention forks attached to selected portions of the rear portions of said bale support rails with each fork having the upper leg extending above the horizontal plane of said bale support rails, having the lower leg extending forward of the upper leg;

two main actuator mounting cross members attached to and between respectively one of said outer bale support rails and the respective facing said front inner support rails;

two pairs of spaced stack bed elevating ears attached to selected lower portions of said actuator mounting cross members and said elevating ears pivotably attached to the distal ends of said main actuators;

a pushback actuator mounting cross member spaced rearward from said stack bed front cross beam and attached to and between said left outer bale support rail and the adjacent facing front inner support rail;

a pushback pivot ear attached to a selected lower portion of said pushback actuator mounting cross member; and one or more central upper bed skin panels attached to upper surfaces of said support rails; and D. a bale pushback and stack clamping assembly comprising:

a pushback pivot mounting sleeve attached to and spaced from and below a left portion of said stack bed front cross beam;

said pivot mounting sleeve sized to rotatably receive and retain coaxially a pair of pushback pivot shaft bearings and a pushback pivot shaft having a rotational axis transverse to the longitudinal axis of said bale support rails;

one or more pushback pivot arms attached at their lower ends to said pushback pivot shaft;

a pushback actuator mounting ear attached to one of said pushback arms;

a bale pushback cross member attached to said pushback arms spaced forward and above said pushback pivot shaft; and a pushback actuator operatively attached between said pushback assembly pivot ear and said pushback actuator mounting ear.

6. A stack bed wagon according to claim 5 wherein the longitudinal axis of said loader arm pivot shaft is angled at about 45 degrees toward the longitudinal axis of said vehicle and descending from rearward to forward at about 35 degrees from the horizontal plane of said stack bed assembly when in the bed down position.

7. A stack bed wagon according to claim 5 wherein the longitudinal axis of said loader arm pivot shaft is angled at about 45 degrees toward the longitudinal axis of said vehicle and descending from rearward to forward at between 32 and 38 degrees from the horizontal plane of said stack bed assembly when in the bed down position.

8. A stack bed wagon according to claim 5 wherein said clamping arms are generally coplanar and when in a bale depositing position are oriented generally in a vertical plane and parallel to each other and perpendicular to the longitudinal axis of said vehicle.

* * * * *